(12) United States Patent
Tsukamoto et al.

(10) Patent No.: US 6,886,396 B2
(45) Date of Patent: May 3, 2005

(54) METHOD FOR EASILY MEASURING NITROGEN OXIDE CONCENTRATION OF AN ENGINE VEHICLE EMISSION

(75) Inventors: Tokihiro Tsukamoto, Miyanohigashi-machi (JP); Koichi Matsumoto, Miyanohigashi-machi (JP); Nobutaka Kihara, Miyanohigashi-machi (JP)

(73) Assignee: Horiba, Ltd., Osaka (JP)

( * ) Notice: Subject to any disclaimer, the term of this patent is extended or adjusted under 35 U.S.C. 154(b) by 379 days.

(21) Appl. No.: 10/291,148

(22) Filed: Nov. 7, 2002

(65) Prior Publication Data

US 2003/0070472 A1 Apr. 17, 2003

Related U.S. Application Data

(63) Continuation of application No. 09/593,534, filed on Jun. 14, 2000.

(30) Foreign Application Priority Data

Jul. 2, 1999 (JP) ............................................. 11-189613

(51) Int. Cl.[7] .................................................. G01M 19/00
(52) U.S. Cl. .................................................... 73/118.1
(58) Field of Search .............................. 73/116, 118.1, 73/23.31, 23.32; 60/272, 276

(56) References Cited

U.S. PATENT DOCUMENTS 5,551,411 A * 9/1996 Ward ........................... 123/684
6,230,487 B1 * 5/2001 Blumenstock et al. ........ 60/286
6,619,107 B1   9/2003 Tsukamoto et al.

* cited by examiner

*Primary Examiner*—Eric S. McCall
*Assistant Examiner*—Maurice Stevens
(74) *Attorney, Agent, or Firm*—Brian F. Swienton

(57) ABSTRACT

The present invention provides a method for easily measuring nitrogen oxide concentration of an engine vehicle emission. The method can measure vehicle emission from an engine of a vehicle in travel with high precision even in regions other than the lean region, that is, regions from the stoichiometrical region to the rich region by using a $NO_x$ sensor exclusively used for the lean region. The present invention has an arrangement in which a $NO_x$ sensor that is exclusively used for the lean region is installed in an exhaust pipe 3 connected to the engine 2. Air (secondary air) A is introduced into the exhaust pipe 3 on the upstream side of the $NO_x$ sensor 6 so that the $NO_x$ sensor 6 is allowed to measure the concentration of $NO_x$ in the engine vehicle emission diluted by air A. Thus, the $NO_x$ concentration in the engine vehicle emission before dilution G is obtained by using the measured value of the $NO_x$ concentration after dilution and by using a dilution ratio.

18 Claims, 1 Drawing Sheet

METHOD FOR EASILY MEASURING NITROGEN OXIDE CONCENTRATION OF AN ENGINE VEHICLE EMISSION

CROSS REFERENCE TO A RELATED APPLICATION

This application is a continuation of application Ser. No. 09/593,534, filed Jun. 14, 2000 and entitled "METHOD FOR EASILY MEASURING NITROGEN OXIDE CONCENTRATION OF AN ENGINE EMISSION", the disclosure of which is hereby incorporated herein by reference thereto.

FIELD OF THE INVENTION

The present invention relates to a method for easily measuring the concentration of nitrogen oxides contained in vehicle emission from an engine of a vehicle such as an automobile.

DESCRIPTION OF THE PRIOR ART

As has been conventionally known, among ingredients contained in emission from the engine of a vehicle such as an automobile (hereinafter, referred to simply as vehicle emission), one type of air pollutant is nitrogen oxides (hereinafter, referred to as $NO_x$).

Conventionally, an automobile is placed on a chassis dynamometer, and the automobile is driven in a predetermined travelling pattern while applying a specific load onto the automobile by controlling the engine speed and torque. $NO_x$, which is contained in the engine vehicle emission, is measured by using a $NO_x$ analyzer, such as a chemiluminescence analyzer.

However, this conventional method requires a considerably large-scale device such as chassis dynamometer in addition to the $NO_x$ analyzer, which makes the measuring equipment costs high. Moreover, in most cases, measurement of $NO_x$ using the chassis dynamometer is only applied to finished cars that have not been driven, and the measurements using the device have not been applied to automobiles that have been already used, that is, so-called used car. With respect to measurements on used car, actual surveys are carried out. However, the ratio of such surveys is low.

As described above, in order to measure the concentration of $NO_x$ discharged from an automobile, it is preferable to carry out measurements with a proper travelling load being applied to the automobile. For this reason, the applicant of the present invention applied for a patent entitled "Method for Easily Measuring Nitrogen Oxides in Travelling Vehicles" on Jan. 29, 1999 (JP Appl. No. 11-23016). In the $NO_x$ measuring method in this patent application, a zirconia $NO_x$ sensor is attached to an exhaust pipe connected to the engine of an automobile. A proper travelling load is applied to the automobile by allowing the vehicle to actually travel on a road while the travelling speed and the gear ratio of the automobile is changed. Thus, the concentration of $NO_x$ generated under load is measured by the zirconia sensor, and in accordance with this method measuring of $NO_x$, $NO_x$ being generated from an engine that is actually in travelling on a road can be measured on a real time basis.

However, in general, in the case where reducing gas such as CO, $H_2$ and HC are present in a rich area (atmosphere without oxygen), the zirconia $NO_x$ sensor fails to provide accurate $NO_x$ concentration values due to interference effects from the reducing gas. For this reason, the zirconia $NO_x$ sensor is only used for measuring vehicle emission in a lean state (atmosphere containing oxygen) such as vehicle emission from a diesel engine.

The present invention has been devised by taking this fact into consideration, and it is an objective to provide a method for easily measuring the nitrogen oxide concentration in engine vehicle emission (hereinafter, referred to as easy measuring method for $NO_x$ concentration in engine vehicle emission) which can measure vehicle emission from an engine of a vehicle in travel with high precision even in regions other than the lean region. That is, regions ranging from the stoichiometrical region to the rich region by using a $NO_x$ sensor exclusively used for the lean region.

SUMMARY OF THE INVENTION

In order to achieve the above-mentioned objective, the method for easily measuring $NO_x$ concentration of an engine vehicle emission in accordance with the present invention has an arrangement in which a $NO_x$ sensor that is exclusively used for the lean region is installed in an exhaust pipe connected to the engine. Air is introduced into the exhaust pipe on the upstream side of the $NO_x$ sensor so that the $NO_x$ sensor is allowed to measure the concentration of $NO_x$ in the engine vehicle emission diluted by air. Thus, the arrangement obtains the $NO_x$ concentration in the engine vehicle emission before the dilution by using the measured value of the $NO_x$ concentration and the ratio of dilution by the air.

In the method for easily measuring $NO_x$ concentration, air (secondary air) is introduced into the exhaust pipe upstream of the $NO_x$ sensor. Therefore, the $NO_x$ sensor is allowed to measure $NO_x$ concentration in the lean region (in an atmosphere containing oxygen). Then, the measured value obtained in the lean region is corrected by using the ratio of dilution by the air so that the $NO_x$ concentration in vehicle emission before the dilution, that is, in vehicle emission from the engine, can be obtained.

More specifically, in the method for easily measuring $NO_x$ concentration of the present invention, first and second air-fuel ratio sensors and a $NO_x$ sensor exclusively used for the lean region are attached to an exhaust pipe connected to the engine. Air is introduced into the exhaust pipe between the first and second air-fuel ratio sensors so that the air-fuel ratio in engine vehicle emission prior to dilution by the air is determined by the first air-fuel ratio sensor and the air-fuel ratio in engine vehicle emission after dilution by the air is determined by the second air-fuel ratio sensor. Thus, the concentration of $NO_x$ in the engine vehicle emission is obtained based upon the results of these measurements, thereby making it possible to easily measure the $NO_x$ concentration.

Moreover, instead of the first air-fuel ratio sensor and the second air-fuel ratio sensor, two λ sensors, used for finding the excessive air rate λ[=(actual air-fuel ratio)/(theoretical air-fuel ratio)], may be installed.

DETAILED DESCRIPTION OF THE PREFERRED EMBODIMENTS

Figure 1:
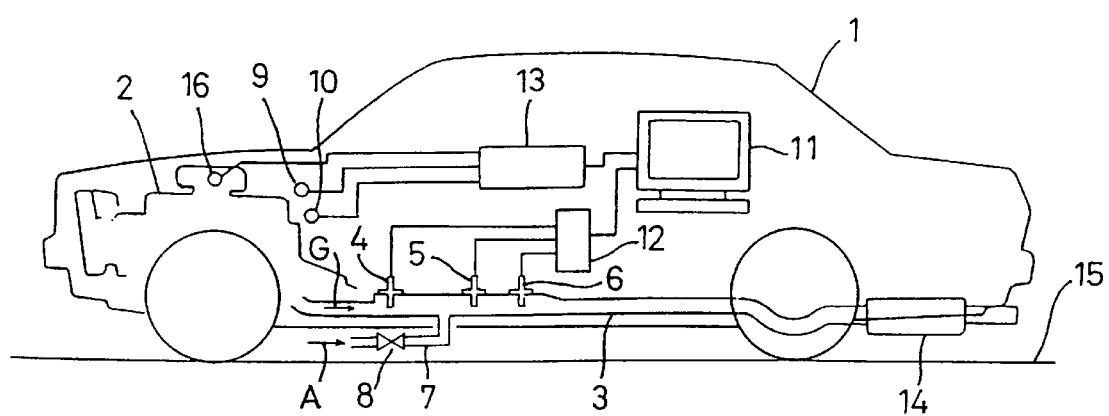
FIG. 1 is a schematic view illustrating an exemplary construction for carrying out a method for easily measuring $NO_x$ concentration in accordance with the present invention.

Referring to FIG. 1, the following description will discuss one embodiment of the present invention. FIG. 1 is a drawing that explains a method for easily measuring $NO_x$ concentration in accordance with the present invention.

Reference number 1 represents, for example, a MT (Manual Transmission) vehicle according to the present test. Reference number 2 represents a gasoline engine (hereinafter, referred to simply as engine) for the vehicle 1, and reference number 3 is an exhaust pipe connected to the engine 2.

Reference numbers 4, 5 are two air-fuel ratio sensors which are attached to the exhaust pipe 3 relatively close to the engine 2 at a predetermined interval, and the two air-fuel ratio sensors 4, 5 are placed with their sensor sections facing the interior of the exhaust pipe. The air-fuel ratio sensor 4 on the upstream side is referred to as the first air-fuel sensor, and the air-fuel ratio sensor 5 on the downstream side is referred to as the second air-fuel sensor.

Reference number 6 is a direct-insertion-type $NO_x$ sensor for measuring the concentration of $NO_x$ and is located downstream of the second air-fuel ratio sensor 5. The $NO_x$ sensor 6 is placed with its sensor section facing the interior of the exhaust pipe 3. An exemplary $NO_x$ sensor which may be used is a zirconia $NO_x$ sensor manufactured by Nippon Gaishi (K.K.) and which utilizes a zirconia solid-state electrolyte.

The above-mentioned sensors 4, 5, 6 can be placed at any location in the exhaust pipe 3. However, since it is necessary to make the sensors 4, 5, 6 unsusceptible to influences of pulsated movements due to air suction at the opening in the downstream end of the exhaust pipe 6, the distance between the $NO_x$ sensor 6 and the opening is preferable set at no less than 500 to 600 mm, for example, in the case of a displacement of 2000 cc.

Reference number 7 is a secondary air inlet tube connected to the exhaust pipe 3 between the first air-fuel ratio sensor 4 and the second air-fuel ratio sensor 5. The secondary air inlet tube 7 converted properly is provided with a lead valve 8. The end connecting the secondary air inlet tube 7 is connected properly to the exhaust pipe 3 by preferably machining to allow the introduced air A (secondary air) to properly mix with the engine vehicle emission G.

Moreover, reference numbers 9 and 10 are an engine speed sensor and a vehicle speed sensor, respectively.

Reference number 11 is a computer (for example, personal computer) serving as a data processing device coupled to the vehicle 1. Outputs of the first air-fuel ratio sensor 4, the second air-fuel ratio sensor 5 and the $NO_x$ sensor 6 are input to the computer 11 through an interface 12, and outputs of the engine speed sensor 9 and the vehicle speed sensor 10 are also input thereto through an interface 13. Reference number 14 is a muffler attached to the exhaust pipe 3 and reference number 15 is the surface of a road.

When the vehicle 1 is allowed to travel on the road surface, vehicle emission G is discharged from the engine 2. The vehicle emission G flows through the exhaust pipe 3 toward the downstream side. Since the secondary air inlet tube 7 is connected to the exhaust pipe 3, air (secondary air) A is introduced into the exhaust pipe 3 to dilute the vehicle emission G. Thus, the introduction of air (secondary air) A brings the $NO_x$ sensor 6 into a lean state (under an atmosphere containing oxygen) with the result that the $NO_x$ concentration of the diluted engine vehicle emission can be measured. The measurement outputs are inputted to the computer 11 as time elapses.

Consequently, the A/F ratio of the engine vehicle emission G prior to dilution by the air (secondary air) A is detected by the first air-fuel ratio sensor 4, and the A/F ratio after dilution by the air (secondary air) A is detected by the second air-fuel ratio sensor 5. Thus, the detection outputs of the air-fuel ratio sensors 4, 5 are also inputted to the computer 11 as time elapses.

The computer 11 executes calculations based on the detection outputs of the $NO_x$ sensor 6 and the air-fuel ratio sensors 4, 5 so that the concentration of $NO_x$ in the engine vehicle emission G before the dilution, that is, in the vehicle emission G discharged from the engine 2, is obtained. For example, supposing that the $NO_x$ sensor 6 has a measured value of 200 ppm, the first air-fuel ratio sensor 4 has a measured output A/F of 12.0, and the second air-fuel ratio sensor 5 has a measured output A/F of 16.0, the $NO_x$ concentration before the dilution is calculated as follows:

$$200(ppm) \times 16/12 = 267(ppm)$$

Moreover, the vehicle 1 is provided with sensors such as the engine speed sensor 9 and the vehicle speed sensor 10, and the outputs of these sensors 9 and 10 are also inputted to the computer 11. While the vehicle 1 is travelling on an actual road surface 12, the $NO_x$ concentration (concentration prior to the dilution) is measured on a real time basis along with the engine speed and the vehicle speed as time elapses. The measured data are properly processed by the microcomputer 6 so that it is possible to easily obtain the relationship between a specific engine speed and a $NO_x$ concentration (concentration prior to the dilution) and the relationship between a specific gear position, a vehicle speed and an $NO_x$ concentration (concentration prior to the dilution).

In the above-mentioned measuring method, a direct-insertion-type $NO_x$ analyzer is used as the $NO_x$ sensor. Since the direct-insertion-type $NO_x$ sensor 5 serves as the direct-insertion-type $NO_x$ analyzer and is attached to the exhaust pipe 3 to measure the $NO_x$ concentration, the device construction for measuring $NO_x$ can be miniaturized as compared with a conventional method using a device such as a chemiluminescence analyzer. The measurements can be easily carried out continuously with high precision. Consequently, it is possible to easily measure $NO_x$ independently of displacement of the vehicle 1.

As described above, the present invention makes it possible to easily measure the $NO_x$ concentration in the exhaust emission from the engine 2 of a gasoline vehicle in travel by using a simple device with high precision, although such a measurement has been considered to be difficult.

In the above-mentioned embodiment, two air-fuel ratio sensors 4, 5 are attached to the exhaust pipe 3. However, in order to measure the rate of excessive air λ, two λ sensors may be installed. In other words, the first λ sensor is installed instead of the first air-fuel ratio sensor 4, and the second λ sensor is installed instead of the second air-fuel ratio sensor 5.

Furthermore, as illustrated in FIG. 1, a suction air meter 16 is installed on the air suction side (primary air suction side) of the engine 2, and the detection output thereof is inputted to the computer 11 so that the vehicle emission flow rate is determined by carrying out proper calculations. The amount of $NO_x$ discharge can be obtained by using the vehicle emission flow rate and the $NO_x$ concentration (concentration to the dilution). Moreover, the suction air meter is not necessarily required to obtain the amount of $NO_x$ discharged, and the amount of suction air may be determined from a fuel flow rate signal output from the ECU of the vehicle and the A/F value prior to the dilution.

In the above-mentioned embodiment, a vehicle in service is used as the test vehicle 1. However, the present invention is not intended to be limited by this, and a so-called brand new 7 car may be used.

As described above, the present invention makes it possible to accurately measure $NO_x$ concentration from the stoichiometrical region to the rich region by using a $NO_x$ sensor exclusively used for the lean region.

Moreover, the present invention differs from a simulated driving process using a chassis dynamometer because an actual engine travelling on a road surface is used to measure $NO_x$ concentration and because the measurement is carried out on a real time basis. The concentration of $NO_x$ discharged from a vehicle in service in its normal travelling state is directly measured (in actual state). Furthermore, the present invention differs from the use of the chassis dynamometer because measurement is easily carried out with high precision by using a relatively simple device.

What is claimed is:

1. A method for easily measuring nitrogen oxide concentration of an engine exhaust gas, comprising:
    measuring a first air fuel ratio within the exhaust gas prior to dilution;
    attaching a lean state $NO_x$ sensor to an exhaust pipe connected to an engine;
    introducing air into the exhaust pipe upstream of the lean state $NO_x$ sensor to dilute the exhaust gas;
    measuring a second air fuel ratio within the diluted exhaust gas;
    measuring the concentration of $NO_x$ within the diluted exhaust gas from a stoichiometrical region to a rich region using the lean state $NO_x$ sensor;
    calculating a dilution ration based on ratio of the measured second air fuel ratio and the first air fuel ratio; and
    determining the $NO_x$ concentration prior to dilution by multiplying the measured concentration of $NO_x$ after dilution by the dilution ratio.

2. The method of claim 1, wherein air is introduced into the vehicle emission to create a lean state.

3. The method of claim 2, wherein the $NO_x$ sensor is a direct-insertion type $NO_x$ analyzer.

4. The method of claim 1, further comprising introducing air into the exhaust pipe upstream of the $NO_x$ sensor through a secondary air inlet tube having a lead valve and connecting the air inlet tube to the exhaust pipe.

5. The method of claim 4, further comprising:
    providing a computer;
    inputting data from the first air-fuel ratio sensor, the second air fuel ratio sensor, and the $NO_x$ sensor into the computer;
    providing an engine speed sensor and a vehicle speed sensor; and
    inputting data from the engine speed sensor and the vehicle speed sensor into the computer.

6. The method of claim 4 further comprising opening said lead valve disposed on said secondary air inlet tube to permit the flow diluting air into said exhaust pipe.

7. The method of claim 1, wherein the $NO_x$ concentration is measured from a vehicle traveling on an actual road, and wherein the $NO_x$ concentration is measured on a real time basis.

8. A method for easily measuring nitrogen oxide concentration of an engine exhaust gas, comprising:
    providing a first air-fuel ratio sensor, a second air-fuel ratio sensor, and a lean state $NO_x$ sensor for measuring the exhaust gas;
    disposing the first air-fuel ratio sensor, the second air-fuel ratio sensor, and the lean state $NO_x$ sensor on an exhaust pipe connected to an engine, the first air-fuel ratio sensor positioned upstream of the second air-fuel ratio sensor, and the second air-fuel ratio sensor positioned upstream of the lean state $NO_x$ sensor;
    introducing air into the exhaust pipe between the first air-fuel ratio sensor and the second air-fuel ratio sensor to dilute the exhaust gas;
    measuring a first air-fuel ratio of the exhaust gas prior to dilution with said first air ration sensor and using the second air-fuel ratio sensor to measure a second air-fuel ratio of the exhaust gas after dilution;
    measuring the concentration of lean state $NO_x$ within the diluted exhaust gas from a stoichiometrical region to a rich region using the lean state $NO_x$ sensor; and
    determining the $NO_x$ concentration prior to dilution by using the measured concentration of $NO_x$ after dilution and a ratio of the second air-fuel ratio and the first air-fuel ratio.

9. The method of claim 8, wherein the $NO_x$ concentration is measured from a vehicle traveling on an actual road, and wherein the $NO_x$ concentration is measured on a real time basis.

10. The method of claim 9, wherein the engine is a gasoline engine.

11. The method of claim 8, wherein the first air-fuel ratio sensor, the second air-fuel ratio sensor, and the $NO_x$ sensor are positioned at a distance no less than 500 mm to 600 mm from an opening at the downstream end of the exhaust pipe.

12. The method of claim 8, wherein the air brings the vehicle emission into a lean state such that the $NO_x$ is able to measure the $NO_x$ concentration.

13. The method of claim 8, further comprising:
    providing a computer;
    inputting data from the first air-fuel ratio sensor, the second air-fuel ratio sensor, and the $NO_x$ sensor into the computer;
    providing an engine speed sensor and a vehicle speed sensor;
    inputting data from the engine speed sensor and the vehicle speed sensor into the computer;
    obtaining a relationship between specific engine speed and $NO_x$ concentration; and
    obtaining a relationship between specific gear position and $NO_x$ concentration.

14. The method of claim 8, wherein the $NO_x$ sensor is a direct-insertion type $NO_x$ analyzer.

15. The method of claim 8, wherein the $NO_x$ concentration is measured from a stoichiometrical region to a rich region.

16. The method of claim 8 further comprising:
    providing a secondary air inlet tube on said exhaust pipe upstream of said $NO_x$ sensor, said secondary air inlet tube having a lead valve disposed thereon; and
    opening said lead valve to permit a flow of air into said exhaust pipe thereby diluting the concentration of said engine exhaust gas.

17. A method for easily measuring nitrogen oxide concentration of an engine exhaust gas, comprising:
    providing a first λ sensor, a second λ sensor, and a lean state $NO_x$ sensor for measuring the exhaust gas;
    disposing the first λ sensor, the second λ sensor, and lean state $NO_x$ sensor on an exhaust pipe connected to an engine, the first λ sensor positioned upstream of the second λ sensor, and the second λ sensor positioned upstream of the lean state $NO_x$ sensor;
    introducing air into the exhaust between the first λ sensor and the second λ sensor, wherein the first λ sensor determines a first air-fuel ratio in the exhaust gas prior to air dilution and the second λ sensor determines a second air-fuel ratio in the exhaust gas after air dilution; and
    determining the $NO_x$ concentration prior to dilution by using the measured concentration of $NO_x$ from a stoichiometrical region to a rich region using said lean state $NO_x$ sensor after dilution and multiplying the measured concentration of $NO_x$ by the ratio of the second and first air-fuel ratios.

18. The method of claim 17 further comprising:

providing a secondary air inlet tube upstream of said $NO_x$ sensor, said secondary air inlet tube having a lead valve disposed thereon; and opening said lead valve to permit a flow of air into said exhaust pipe thereby diluting the concentration of said engine exhaust gas.

* * * * *

UNITED STATES PATENT AND TRADEMARK OFFICE
CERTIFICATE OF CORRECTION

PATENT NO.   : 6,886,396 B2
DATED        : May 3, 2005
INVENTOR(S)  : Tsukamoto et al.

It is certified that error appears in the above-identified patent and that said Letters Patent is hereby corrected as shown below:

Column 1,
Lines 41 and 42, replace "car" with -- cars --.
Line 60, delete "in".

Column 5,
Line 26, replace "ration" with -- ratio --.

Column 7,
Line 2, replace "ration" with -- ratio --.

Signed and Sealed this

Twentieth Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,886,396 B2
DATED : May 3, 2005
INVENTOR(S) : Tsukamoto et al.

It is certified that error appears in the above-identified patent and that said Letters Patent is hereby corrected as shown below:

<u>Title page,</u>
Item [*] Notice, replace "379 days" with -- 555 days --.

Signed and Sealed this

Eleventh Day of April, 2006

JON W. DUDAS
*Director of the United States Patent and Trademark Office*